United States Patent [19]

Kostić

[11] Patent Number: 5,536,079
[45] Date of Patent: Jul. 16, 1996

[54] CABINET

[75] Inventor: Mirko Kostić, Baden, Switzerland

[73] Assignee: Asea Brown Boveri Ltd., Baden, Switzerland

[21] Appl. No.: 352,178

[22] Filed: Dec. 5, 1994

Related U.S. Application Data

[63] Continuation of Ser. No. 885,631, May 19, 1992, abandoned.

[30] Foreign Application Priority Data

May 22, 1991 [CH] Switzerland .............................. 1514/91

[51] Int. Cl.⁶ ............................................. H02B 1/01
[52] U.S. Cl. ................................. 312/265.3; 312/265.5; 312/223.1
[58] Field of Search ............................ 312/265.1, 265.2, 312/265.3, 265.4, 265.5, 223.1

[56] References Cited

U.S. PATENT DOCUMENTS

| | | | |
|---|---|---|---|
| 1,374,868 | 4/1921 | White et al. | 312/265.2 |
| 1,919,986 | 7/1933 | Powers. | |
| 3,034,844 | 5/1962 | Anderson et al. | 312/265.4 |
| 3,056,639 | 10/1962 | Caminker et al. | |
| 3,110,535 | 11/1963 | Anderson | 312/265.1 X |
| 3,149,891 | 9/1964 | Wilmer | 312/265.1 |
| 3,265,419 | 8/1966 | Durnbaugh et al. | 312/265.1 X |
| 3,410,621 | 11/1968 | Schreyer | 312/265.1 |
| 3,563,627 | 2/1971 | Whipps | 312/265.2 |
| 4,102,554 | 7/1978 | Reimer | 312/265.1 X |
| 4,114,336 | 9/1978 | Bechet et al. | 312/265.1 X |
| 4,126,364 | 11/1978 | Reilly | 312/265.1 X |
| 5,147,121 | 9/1992 | McIlwraith | 312/265.4 X |

FOREIGN PATENT DOCUMENTS

| | | |
|---|---|---|
| 2030686 | 11/1970 | France. |
| 7029180 | 12/1970 | Germany. |
| 1938879 | 2/1971 | Germany. |
| 2816287 | 10/1979 | Germany. |
| 8300044 U | 6/1983 | Germany. |

OTHER PUBLICATIONS

"Extrusions Give Flexibility to Enclosure Systems", *Electrical Design News*, 9 (Feb. 1964), pp. 82–83.

Primary Examiner—Joseph M. Gorski
Attorney, Agent, or Firm—Burns, Doane, Swecker & Mathis

[57] ABSTRACT

A cabinet includes a supporting metallic framework having a rectangular shape. At the corners of the cabinet are sheet-metal framework posts connected to a roof panel and a floor panel. The roof panel and the floor panel are formed from identical parts. Casing parts are fitted to the framework. The cabinet is adapted to be easily assembled and equipped for a high protection class.

11 Claims, 6 Drawing Sheets

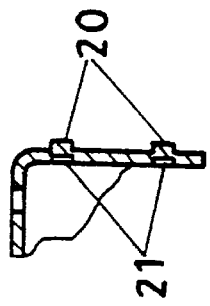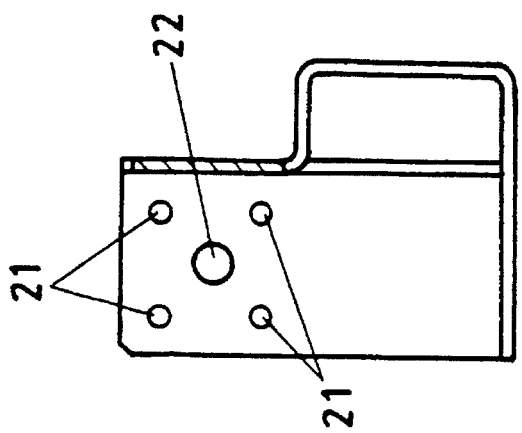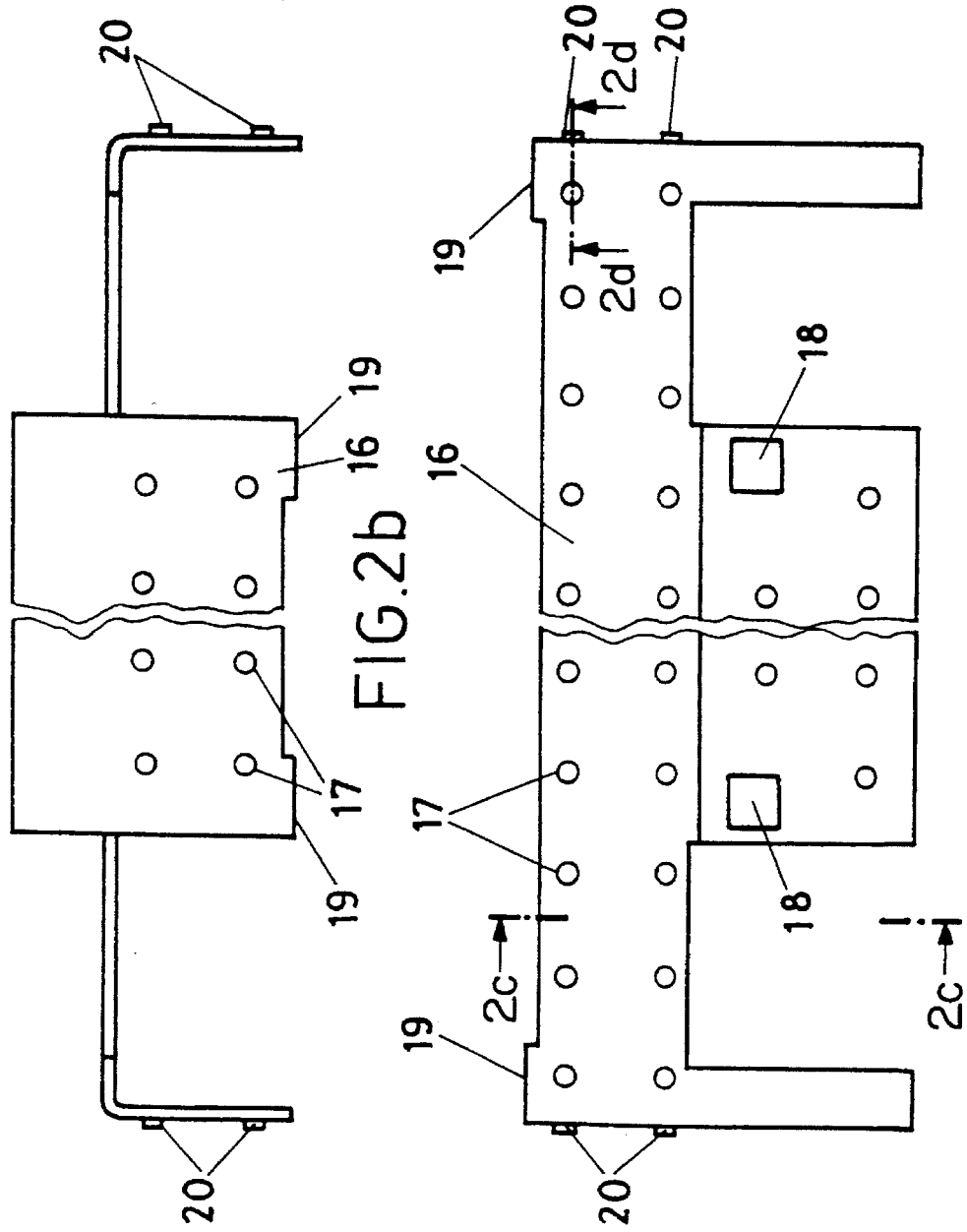

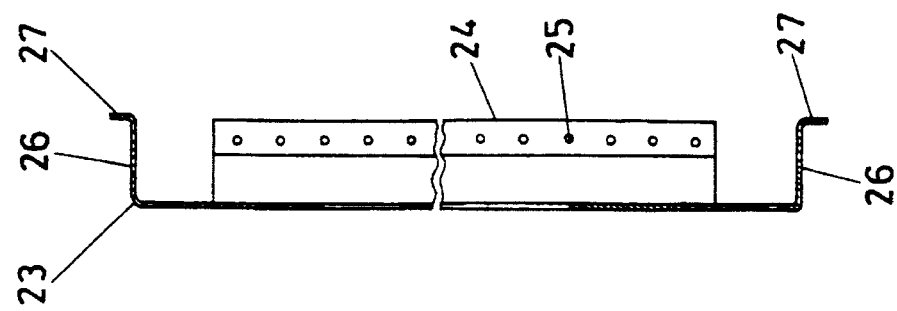
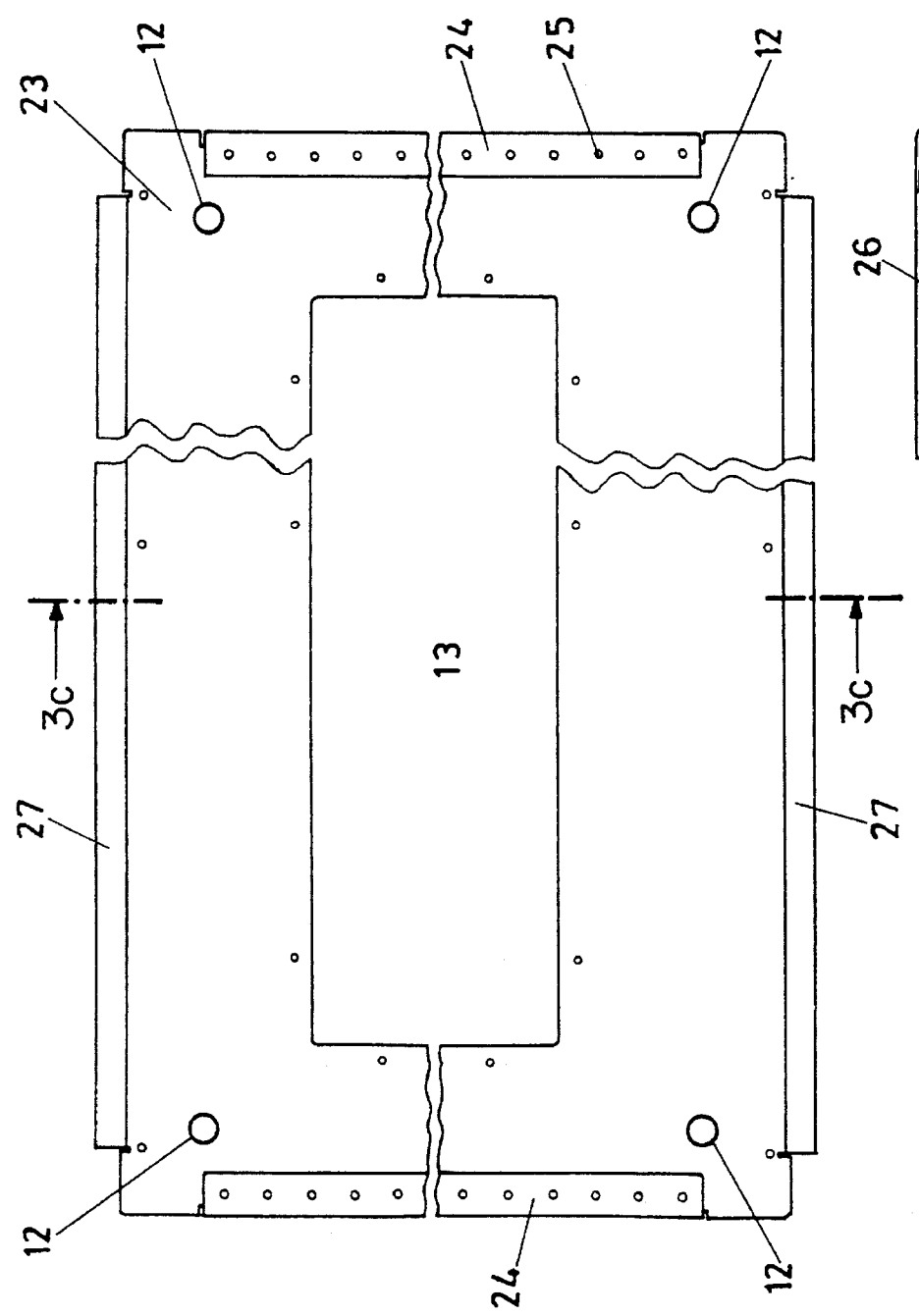
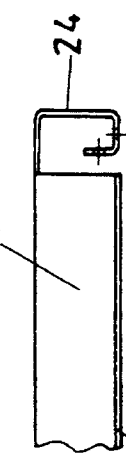

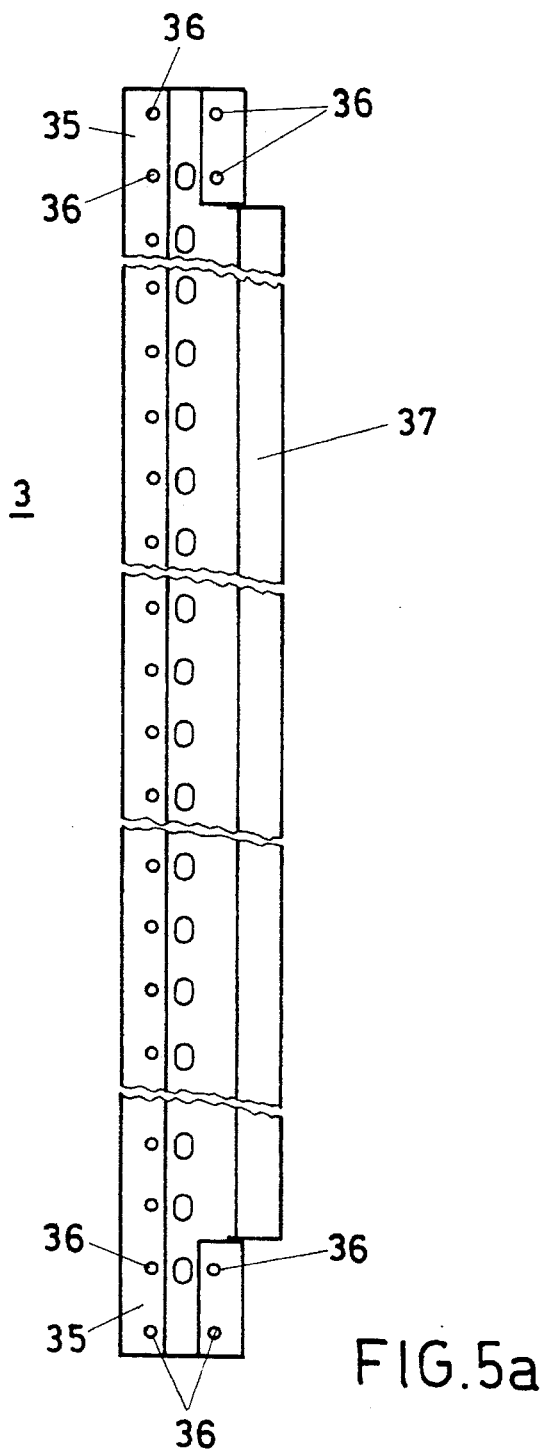
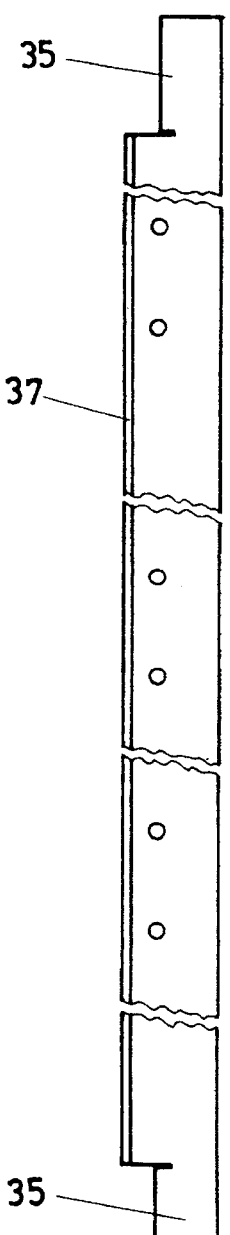
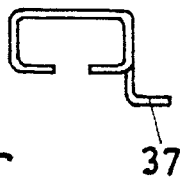
FIG.5b    FIG.5a
FIG.5c 5,536,079

CABINET

This application is a continuation of application Ser. No. 07/885,631, filed May 19, 1992, and now abandoned.

BACKGROUND OF THE INVENTION

1. Field of the Invention

The invention is based on a cabinet according to the preamble of claim 1.

2. Discussion of Background

Cabinets having a supporting metallic framework exhibiting a rectangular base and having framework posts in the area of the corners of the base are already known. The framework posts are made from C-shaped members, as are the connecting parts between the posts. This framework is then provided with casing parts, for example with doors on the front and rear faces, with side walls and roof and floor panels. A wide variety of embodiments of such cabinets is known. The C-profiles which are used are provided with a standard perforated grid, so that, when the cabinets are fitted out, the installation parts can be quickly fitted by means of thread-forming screws. Cabinets of this type can be used, for example, in low-tension distribution plants or as electronic cabinets for protection systems or for control purposes. Electronic cabinets are frequently provided with swivel frames for the installation of electronic equipment.

In the case of hitherto conventional cabinets, the cabinet framework is screwed together at the correct angles in complex assembling jigs. For the framework corners, special construction elements are sometimes necessary, which are complex and expensive. Where a cabinet of this type is intended to be equipped for a higher protection class, this is generally only possible by comparatively laborious assembly.

SUMMARY OF THE INVENTION

The aim of the invention is to remedy this situation. The invention, as it is defined in the claims, achieves the object of providing a cabinet having a supporting metallic framework, which cabinet is relatively easy to assemble and can additionally be relatively easily equipped for a high protection class.

The advantages obtained by the invention can essentially be seen in the fact that the cabinet framework can be erected using simple means and exhibits a relatively high level of rigidity. An assembling jig is only necessary where a row of cabinets needs to be put together. Particularly advantageous is the fact that the front door and, where necessary, also the rear-face door can be easily sealed for a high protection class above IP 50. Moreover, a swivel frame for the installation of electronic components can be easily installed without any adaptation work.

The further designs of the invention form the subjects of the dependent claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2a–d show a diagram of a bracket for the cover panel, FIGS. 3a–c show a diagram of a part of the cover panel, FIGS. 5a–c show a diagram of a framework post.

DESCRIPTION OF THE PREFERRED EMBODIMENTS

Figure 1:
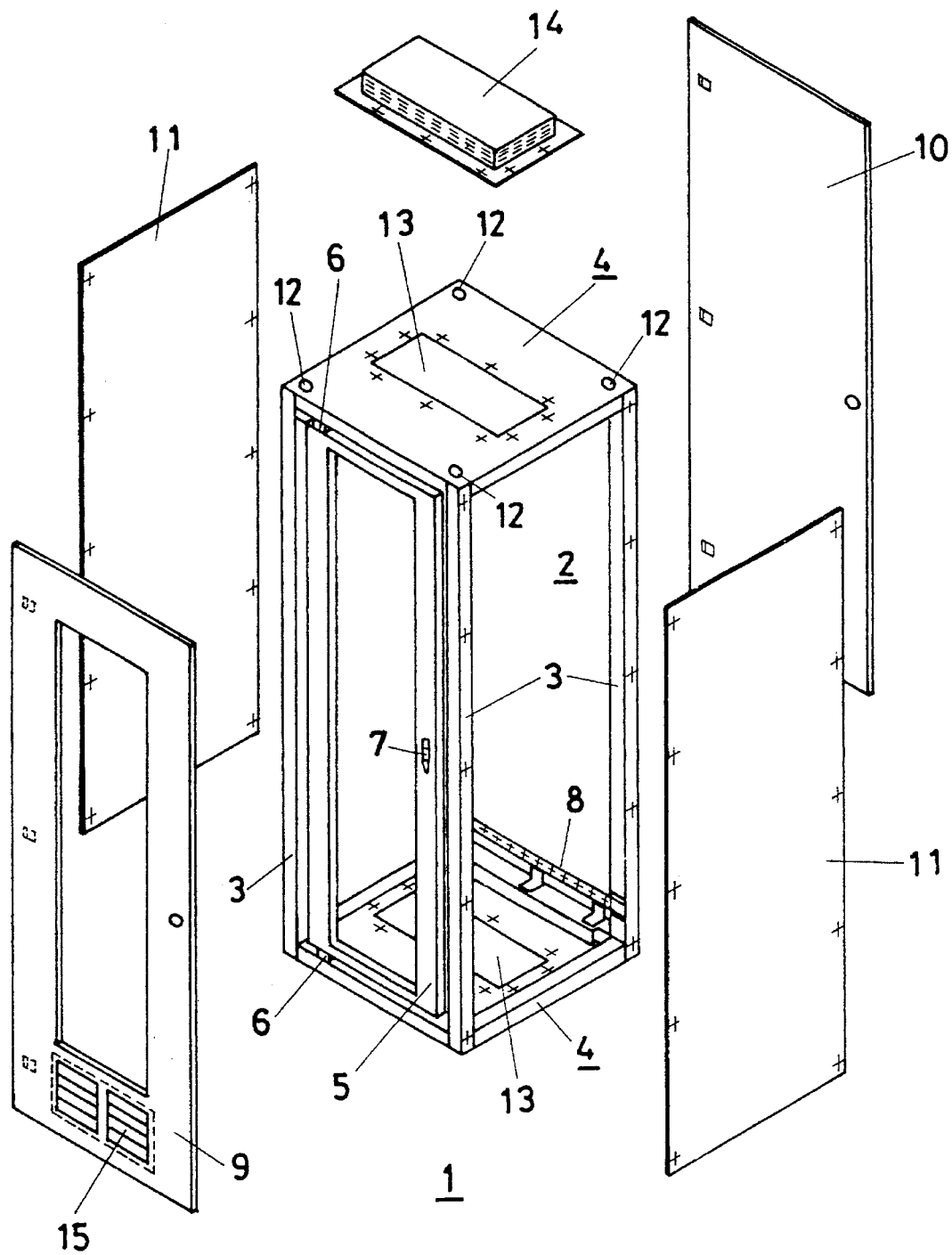
FIG. 1 shows a highly simplified exploded drawing of a cabinet according to the invention.

Referring now to the drawings, wherein like reference numerals designate identical or corresponding parts throughout the several views, in FIG. 1 a highly simplified exploded drawing of the cabinet 1 according to the invention is represented. The cabinet 1 exhibits a supporting, metallic framework 2. This framework 2 comprises four sheet-metal-profile framework posts 3 at the corners of the rectangular base. At the top and bottom, the framework posts 3 are provided with cover panels 4. These cover panels 4 are configured as part of the supporting framework 2. The two cover panels 4 are configured as identical parts, thereby simplifying stockholding. Into the framework 2, there is inserted in this representation, for example, a swivel frame 5, which is used for the installation of electronic assemblies. Mountings 6, supporting the swivel frame 5, are screwed at the top and bottom to the cover panels 4. In this representation, for example, the swivel frame 5 is butted on the left and a locking bar (not shown), which is actuated by a handle 7, fixes the swivel frame 5 in the swivelled-in position shown. There is additionally installed in the framework 1 a grounding bar 8, which is connected both to the bottom cover panel 4, which is used as a floor panel, and to the adjacent framework posts 3. The framework posts 3, the cover panels 4 and also the swivel frame 5 are provided with a bore grid for fastening installation parts by means of thread-forming screws. Bores are also provided for fitting insert nuts or similar fastening elements, as required.

The cabinet 1 exhibits a front face, which can be closed by a front door 9, which is fastened by means of hinges to the left-hand post of the front framework posts 3. The rear face of the cabinet 1 is also in this representation covered, for example, by a hinged door 10, thereby improving access to the cabinet interior for wiring works. At both sides, the cabinet 1 is covered by means of side walls 11. The side walls 11 are screwed tightly to the framework 2. In the top cover panel 4, openings 12 are provided which are equipped with transport eyelets for the crane transportation of the cabinet 1. If the cabinet 1 is intended to be ventilated, a cutout 13 is closed off in the top cover panel 4 by means of an air-permeable dome 14. Heated air escapes through the dome 14. The after-current of cool air is brought about by grilles 15 in the lower part of the front door 9 or other ventilation openings which can be fitted in the cabinet casing. The cut-out 13 in the bottom cover panel 4 serves for the leading in and out of cables, the surface area which remains free generally being closed off by coverings.

The cabinet 1 can be designed for various protection classes. Even protection classes higher than IP 50 can be easily obtained. Moreover, previously supplied cabinets 1 can be quickly and safely retrofitted on the spot, by relatively simple means, for a higher protection class.

FIG. 2a shows a top view of a bent sheet-metal bracket 16. This bracket 16 is a component part of the cover panel 4. Two of these brackets 16 are welded into each cover panel 4, one each on the front and rear faces respectively. The bracket 16 exhibits a grid of bores 17, into which bores thread-forming screws can be screwed whenever parts are intended to be fastened to the bracket 16; the bracket additionally exhibits rectangular cut-outs 18, into which, where required, locking bars, e.g. of a swivel frame locking mechanism, are able to engage. FIG. 2b shows a side view of the bracket 16 according to FIG. 2a. FIG. 2c shows the section 2c—2c and FIG. 2d the section 2d—2d through the bracket 16 according to FIG. 2a. The bracket 16 exhibits a plurality of lugs 19, which are provided as welding points. It additionally exhibits cams 20, which have been produced by a die which left behind the impressions 21. A bore 22 is provided in the center between the cams 20.

FIG. 3a shows a top view of a bent sheet-metal base frame 23 of the cover panel 4. The base frame 23 is bent in the form of a sheet-metal trough, the side walls 24 of the sheet-metal trough, which will subsequently lie against the left-hand and right-hand side walls of the cabinet 1, being bent up as part of a C-profile, as shown in FIG. 3b. The side walls 24 are additionally provided with a grid of bores 25, into which bores thread-forming screws can be screwed. The floor of the sheet-metal trough is generally provided with a cut-out 13. As the section 3c—3c in FIG. 3c shows, the other two side walls 26 are bent up perpendicular to the floor of the sheet-metal trough and, at the top, parallel to the floor of the sheet-metal trough, there is attached to them an outwardly protruding sealing edge 27. The sealing edges 27 accordingly project perpendicularly from the front face or the rear face of the cabinet 1.

Figures 4A, 4B:
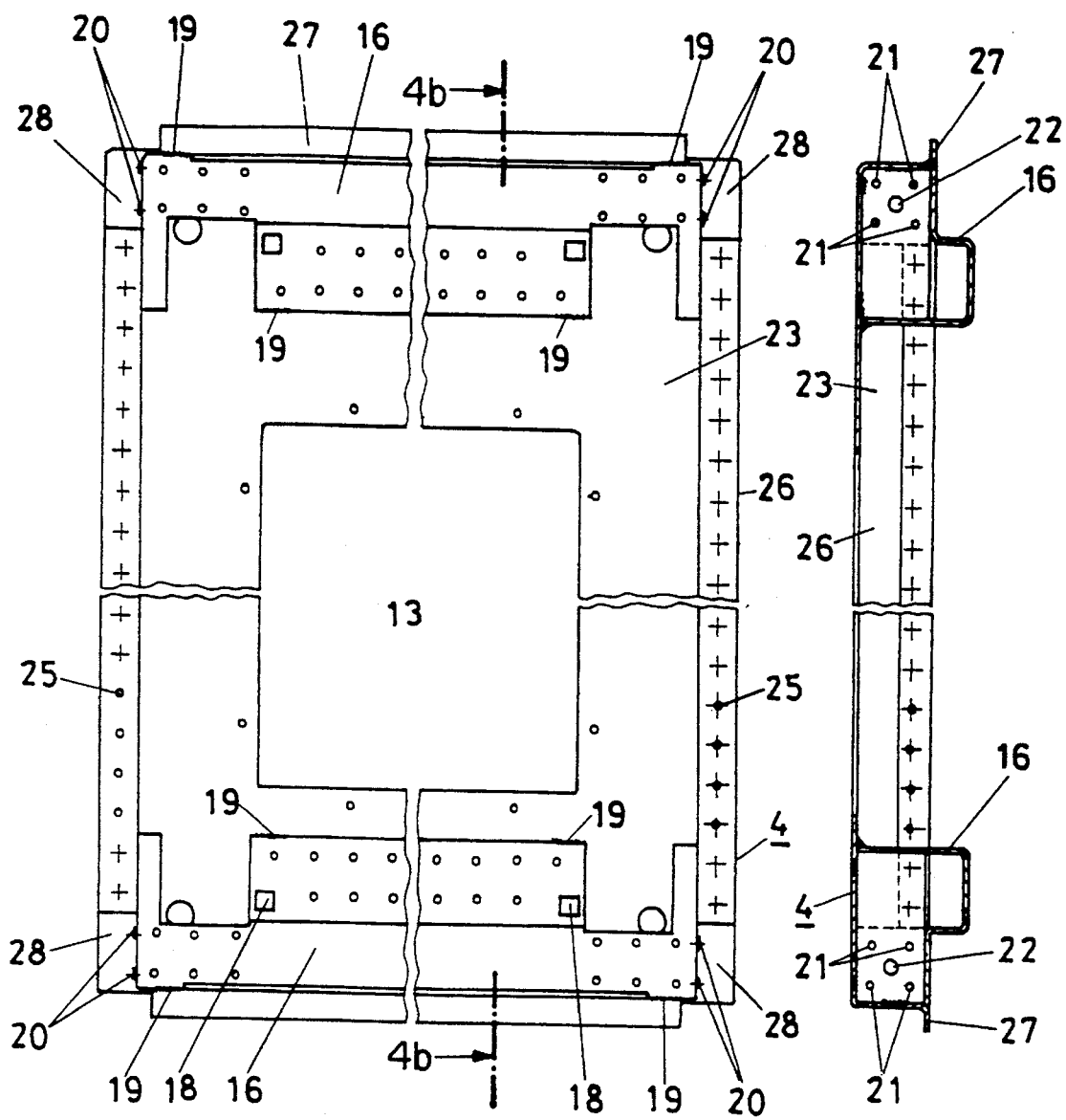
FIGS. 4a–b show a diagram of a complete cover panel.

FIG. 4a shows the complete cover panel 4, which has been welded together in twist-resistant manner out of the base frame 23 and two brackets 16. The two brackets 16 have been welded in, in mirror image of one another, on the front and rear faces. Weld seams were not only provided on the lugs 19; as can be seen from the section 4b—4b represented in FIG. 4b, side walls of the brackets 16 were also fastened a number of times by weld seams to the base frame 23. In this way, the cover panel 4 is provided with a stable and twist-resistant frame. At the four corners of the cover panel 4, this frame leaves, in each case, a rectangular surface area 28 free above the panel of the base frame 23. Into the area above the surface areas 28, there also protrude the cams 20 of the brackets 16. These cams 20 serve to position the framework posts 3, which, by virtue of their cross section, occupy precisely the surface area 28 which remains free, thereby obtaining a rectangular outline for the framework 2.

FIG. 5a shows a framework post 3, which is also provided with a perforated grid. Some of these bores are provided for the fitting of thread-forming screws, whilst, if required, insert nuts can be inserted into the elongated recesses. The framework post 3 exhibits at each end an endpiece 35, which is configured as a C-shaped, as shown by FIG. 5c, which represents a top view of the framework post 3. In the area of the endpiece 35 there are provided 4 bores 36, into which, during the assembly of the framework 2, the cams 20 fit when the framework post 3 is suitably inserted. On the remaining length of the framework post 3, an arm of the C-shaped member has been bent up and extended by an integrally attached sealing edge 37. FIG. 5b shows a side view of the framework post 3. Depending upon the height of the framework 2, the framework posts 3 can be configured in various lengths. The framework posts 3 are fixed in the framework 2 in such a way that, in each case, the integrally attached sealing edge 37 stands perpendicularly on the front or rear face of the cabinet 1.

Figure 6:
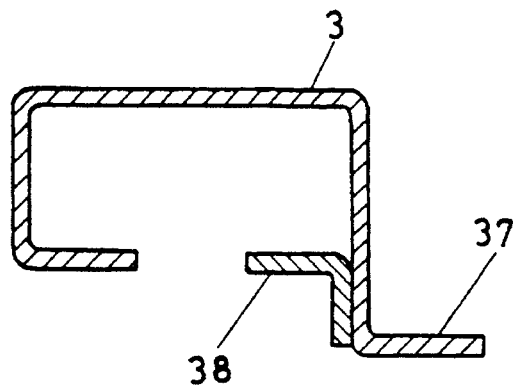
FIG. 6 shows a first variant of a framework post.
Figure 7:
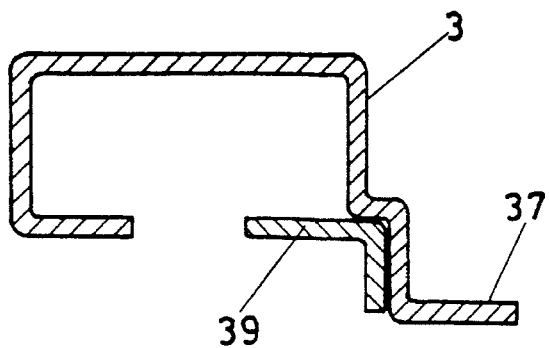
FIG. 7 shows a second variant of a framework post and FIG. 8 shows a diagrammatic representation of an assembled seal.

FIG. 6 shows a cross section through a modified framework post 3, in which an angled profile 38 has been additionally welded in in the area in which the one arm of the C-shaped member is bent up. This angled profile 38 supplements the bent-up C-shaped member to form a C-shaped member which is genuine in this area also, thereby giving rise to advantages in terms of the rigidity of the arrangement. The angled profile 38 is also provided with grid bores, which match the corresponding bores on the other arm of the C-shaped member. The bearing surface for parts to be assembled is smaller, by the thickness of the angled profile 38, than the bearing surface as offered by the endpiece 35. The embodiment according to FIG. 7 having the welded-in angled profile 39 offers, when the bent-up arm of the C-shaped member is suitably offset, the same bearing surface as the endpiece 35. C-shaped member of the same configuration as the endpiece 35 are frequently used, so that coordinated installation parts do not have to be matched to these dimensions if framework posts according to FIG. 7 are now newly inserted.

Figure 8:
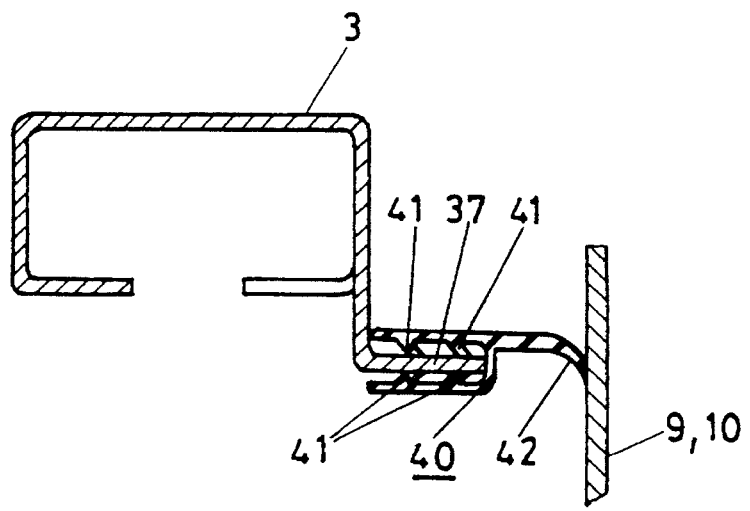

The framework 2 is now assembled in such a way that the sealing edges 37 of the framework posts 3 and the sealing edges 27 of the cover panels 4 abut one another in such a way that a sealing strip running rectangularly around the framework openings on the front face and rear face of the cabinet 1 is formed. This sealing strip lies within the area covered by the front door 9 or by the door 10. For a low protection class, this sealing strip forms with the doors 9 or 10 a perfectly adequate labyrinth seal. However, if this sealing point is intended to be designed for a higher protection class, for example spraywater-tight, then, as shown in FIG. 8, an elastic seal 40 is pushed onto the sealing edge 37. Seals 40 of this type are commercially available in cut lengths. Between the sealing edge 37 and the seal 40, sealing lips 41 ensure a tight seal. The seal 40 additionally exhibits an elastic lip 42, which extends forwards from the sealing edge 37. The closing doors 9, 10 press against this lip 42, so that a spraywater-tight seal is formed. The seal 40 is mounted on the sealing edges 27 and 37, so that only a single interface is produced, the edges of which, however, are pressed against one another in such a way that no spraywater is able to infiltrate at this point.

The side walls are fastened in spraywater-tight manner by means of flat seals stuck onto the framework posts 3 and onto the side parts of the cover panels. The cover panels 4 are closed, of course, in the outward direction, so that the need for a protection class-dependent seal is obviated here. It is only in the area of the corners that an additional seal with silicone plastic or specially adapted seals might, in some circumstances, be necessary. In this case, the dome 14 must of course be designed according to the higher protection class, as must the transition from the dome 14 to the top cover panel 4. The lower cut-out 13 must also be sealed according to the required protection class. These are known measures, which do not here require further examination.

The framework posts 3 are fastened to the respective cover panel 4 by means of a pressure plate provided centrally with a thread, which pressure plate is guided in the C-shaped member of the endpiece 35. The pressure plate is not represented, since connections of this type belong to the prior art. Through a bore 22 of the respective cover panel 4, a screw is screwed into the thread of the pressure plate and the pressure plate forces the endpiece 35 of the framework post 3 against the cover plate 4. The cams 20 of the cover plate 4 engage into the bores 36 of the endpiece 35 and position the framework post 3 at the correct angle. No assembling jig is generally necessary for this simple assembly, so that advantageously quick working is possible.

The pressure plate can also be configured longer than the endpiece 35 and can also be rigidly connected to the framework post 3.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A cabinet having a supporting metallic framework exhibiting a rectangular base, the cabinet having sheet metal, shaped framework posts disposed at corners of the base, having at least one roof panel and at least one floor panel, and having casing parts which are fitted to the framework, wherein:

the roof panel and the floor panel are identical parts, the roof panel and the floor panel each including welded-in brackets disposed along the front face and along the rear face of the cabinet and integrally attached shaped members along two opposite side walls of the cabinet, the roof panel and the floor panel form part of the supporting framework, at each corner of the roof and floor panels, there is provided a recess defined by one of the welded-in brackets and an adjacent one of the shaped members, each recess having a rectangular surface area for receiving an endpiece of a framework post and means, cooperating with corresponding means on each endpiece, for correctly positioning the framework post relative to the roof and floor panel, and the framework posts having one of the endpieces at each end thereof, the endpieces being configured as C-shaped members, wherein the brackets include mountings and cut-outs, and the cabinet further includes a swivel frame attached to the cabinet on the mountings, and a locking bar engageable with the cut-outs for fixing the swivel frame in a swivelled-in state.

2. A cabinet, comprising:

a framework defining a front face, a rear face, and two side faces of the cabinet, the framework including a rectangular roof panel, the roof panel including brackets welded to the roof panel at front and rear edges of the roof panel, the brackets including surfaces extending perpendicularly from the roof panel, the roof panel being formed with integrally attached shaped members extending perpendicularly from the roof panel, surfaces of the brackets and the shaped members defining, with exterior edges of the roof panel, a rectangular surface and forming a recess at each corner of the roof panel, a rectangular floor panel, the floor panel including brackets welded to the floor panel at front and rear edges of the floor panel, the brackets including surfaces extending perpendicularly from the floor panel, the floor panel being formed with integrally attached shaped members extending perpendicularly from the floor panel, surfaces of the brackets and the shaped members defining, with exterior edges of the floor panel, a rectangular surface and forming a recess at each corner of the floor panel, and framework posts extending between the corner of the floor panel and the roof panel, each of the framework posts being formed from a C-shaped member having a base portion and two arm portions, each of the framework posts having C-shaped end portions, the ends of the framework posts being received in the recesses in the roof and floor panels and being fastened to the surfaces of the brackets defining the rectangular surface with fastening means, wherein the roof and floor panels are identical;

a front door attached to the front face of the cabinet;

a rear door attached to the rear face of the cabinet;

two side walls attached to the two side faces of the cabinet;

a swivel frame;

mountings for the swivel frame; and a swivel frame locking bar, the mountings being attached to the brackets, the brackets being provided with cut-outs for engaging the locking bar to fix the swivel frame in a swivelled-in state.

3. The cabinet as set forth in claim 2, wherein the roof and floor panels each include integral sealing edges, at front and rear edges of the roof and floor panels, that stand perpendicularly to the front and rear faces of the cabinet, the brackets at the front and rear edges of the roof and floor panels extending along the front and rear edges of the roof and floor panels and thereby stiffening the front and rear edges of the roof and floor panels, and the integrally attached shaped members being formed such that they stiffen the roof and floor panels along side edges of the roof and floor panels.

4. The cabinet as set forth in claim 2, wherein an intermediate portion of each of the framework posts between the ends of each of the posts is bent to form an integral sealing edge, each of the framework posts being bent and positioned relative to front and rear faces of the cabinet such that the sealing edges of the framework posts stand perpendicularly to the front and rear faces of the cabinet.

5. The cabinet as set forth in claim 4, wherein the intermediate portion of each of the framework posts is reinforced by a welded-on angled member having two substantially perpendicular arms, the angled member being attached to the framework posts such that one of the arms of the angled member forms a C-shape with the unbent portion of the intermediate portion of the framework posts.

6. The cabinet as set forth in claim 4, wherein the sealing edges of the framework posts and the sealing edges of the roof and floor panels abut one another and form rectangular sealing surfaces running around framework openings on the front face and the rear face of the cabinet.

7. The cabinet as set forth in claim 6, further comprising seal means formed of elastic material, the seal means being disposed between the front and rear doors and the sealing surfaces on the front and rear faces of the cabinet.

8. The cabinet as set forth in claim 2, wherein the fastening means includes screws for fixing the framework posts to the roof and floor panels.

9. The cabinet as set forth in claim 8, wherein the fastening means includes a pressure plate disposed inside of the ends of the framework posts.

10. The cabinet as set forth in claim 2, wherein a correctly angled guide for the framework posts is provided in the roof and floor panels.

11. The cabinet as set forth in claim 10, wherein the correctly angled guide includes cams formed in the brackets for interacting with bores in the framework posts.

* * * * *